April 1, 1969   A. E. H. ELMER   3,436,017

TEMPERATURE FLUID CONTROL VALVES

Filed May 4, 1967

INVENTOR
ARTHUR E. H. ELMER
BY *Young & Thompson*
ATTORNEYS

United States Patent Office 3,436,017
Patented Apr. 1, 1969

3,436,017
TEMPERATURE FLUID CONTROL VALVES
Arthur Ernest Henry Elmer, Painswick, England, assignor to Dynair Limited, Stroud, England, a British company
Filed May 4, 1967, Ser. No. 636,052
Int. Cl. G05d 27/00, 7/00; F16k 21/00
U.S. Cl. 236—92                                  7 Claims

ABSTRACT OF THE DISCLOSURE

A thermally actuated pneumatic control valve including a hollow spool sliding in a valve bore and two separately movable control plungers within the spool, one plunger being engaged by the operating element of a wax capsule thermal senser, to close a vent passage, and at a higher temperature to shift the second plunger to open an inlet port, while at even higher temperatures the spool moves with the two plungers without affecting valve operation.

---

Figure 1:
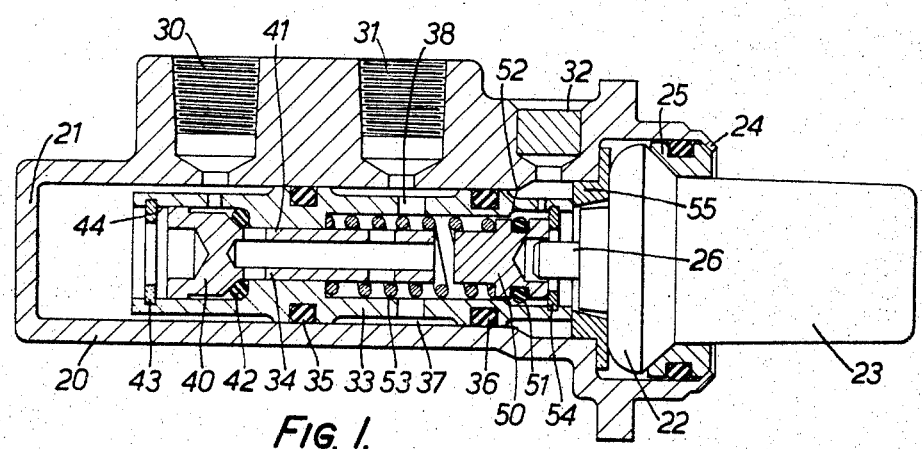

This invention relates to fluid control valves and is particularly though not exclusively applicable to thermally actuated fluid control valves arranged to be opened or closed when a thermal sensing control element reaches a preselected temperature or temperature range.

The thermal sensing control element may, for example, be of the wax capsule type comprising a casing filled with a substance that expands at a relatively low rate until a predetermined temperature is reached, and thereafter at a relatively high rate so as to force a plunger out of one end of the casing. A difficulty experienced with such control elements is that the plunger continues to move as the temperature rises and allowance must be made in the design of the valve to give corresponding freedom of movement since the control element would otherwise be damaged. If a simple spring is used to accommodate the full travel of the control element the spring must necessarily be rather lengthy and as the spring is distorted the spring force will be varied, which is in some cases undesirable.

Accordingly it is an object of the present invention to provide an improved fluid control valve which will accommodate a wide range of movement of a control member, and which can be of relatively small dimensions. Another object is to provide a fluid control valve with a main flow control section and a secondary flow control section which may be used, for example, to connect one of the valve ports to relief.

From one aspect the invention consists in a fluid control valve comprising co-operating valve members capable of relative movement in an operating direction to open or close the valve, both members being individually movable in the said direction, and including restraining means tending to prevent such movement of one member, and abutment means acting between the members to cause them to move together when the other member reaches a selected position relative to the first member.

From another aspect the invention consists in a fluid control valve comprising two co-operating individually movable valve members, within a valve housing, spring means acting between the members, to urge them towards one operative valve position, resilient or pressure operated means acting on one member in a direction opposing the spring means, and abutment means between the two members, causing conjoint movement thereof after distortion of the spring means.

Preferably the second movable valve member is slidable in a valve housing and one end of this member is exposed to the pressure of the fluid controlled by the valve, and in a preferred construction the fluid pressure acts on parts of both the first and second movable valve members.

According to a preferred feature of the invention the co-operating valve members act to control the flow of fluid from an inlet passage to an outlet passage, and the valve includes a vent valve operatively connected to one or other of the valve members and arranged to connect the outlet passage to relief when the main valve is closed.

The valve may include stop means limiting the movement of the first valve member, and according to another preferred feature of the invention the first valve member is subject to the pressure of the fluid being controlled, and is arranged to move in a direction to close the valve when the pressure of the fluid falls.

Figure 2:
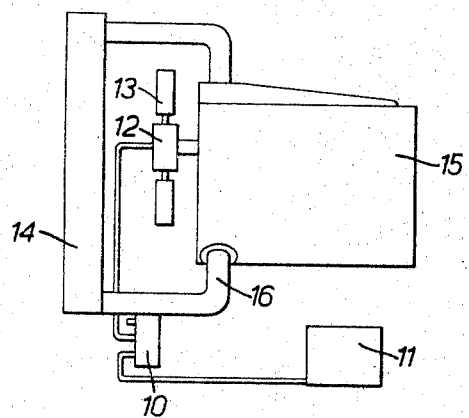

The invention may be performed in various ways and one specific embodiment will now be described by way of example with reference to the accompanying drawings, in which FIGURE 1 is a sectional side elevation through a valve according to the invention, and FIGURE 2 is a diagrammatic illustration of the valve included in a cooling fan control system for a vehicle motor.

In this example the invention is applied to a thermally operated compressed air control valve indicated generally at 10 in FIGURE 2, for controlling the flow of compressed air from a compressed air source 11 to a pneumatically operated clutch 12 incorporated in the drive of a cooling fan 13 arranged to draw cooling air through a radiator 14 forming part of the cooling system of a vehicle engine 15. The thermal control element of the valve senses the temperature of the water in the cooling system inlet 16 to the engine and when this temperature reaches a predetermined value the valve is opened to admit compressed air to the clutch 12 which then engages so that the fan is driven. One preferred form of clutch is described in copending U.S. application No. 564,135. When the temperature falls the valve is closed and at the same time a vent port is opened allowing the air in the clutch operating cylinder to escape.

As illustrated in FIGURE 1, the valve comprises a cylindrical housing 20 which is closed at one end 21 and a lip 24 at the other open end is designed to be swaged over a seal 25 engaging the rim 22 of a wax capsule type thermal control element 23, the body of the wax capsule being mounted in the duct 16 of the cooling systems so as to be exposed to the water temperature. An operating plunger 26 extends from the wax capsule centrally into the valve housing.

At the end of the housing remote from the wax capsule there is provided a compressed air inlet port 30, at an intermediate point there is an outlet port 31 leading to the clutch operating cylinder and at the end of the housing adjacent the capsule there is a vent port 32 to atmosphere.

Within the valve housing two separately movable valve members are provided, the first of which is a hollow spool or sleeve 33 while the second is in the form of a poppet valve member 34 and is contained within the bore of the first valve member. The valve sleeve 33 has annular seals 35, 36 of the O-ring type at opposite ends, forming sealing engagement with the internal surfaces of the housing, the distance between the seals being such that they always lie on opposite sides of the outlet port 31. Between the seals an annular space 37 around the valve sleeve communicates at all times with the outlet port 31 and through radial passages 38 in the valve sleeve with the central bore therein.

The second poppet valve member 34 has an enlarged head 40 at the end remote from the wax capsule and a hollow stem 41 which passes freely through a constriction in the central bore in the valve sleeve. The head 40 engages a surrounding O-ring 42 positioned in a chamber 44 of enlarged diameter at the adjacent end of the valve sleeve, when the poppet valve member moves relative thereto in a direction towards the wax capsule, and in this position closes the flow passage from the high pressure inlet port 30 into the interior of the valve sleeve. When the poppet valve member 34 moves a predetermined distance in the opposite direction relative to the valve sleeve 33, i.e. to the left in FIGURE 1, the head 40 engages a lost motion abutment in the form of a spring clip 43 fitting in the open end of the valve sleeve. This movement also disengages the head from the O-ring 42, and radial ports 45 through the hollow stem 41 provide communication between the chamber 44 and the central bore of the valve sleeve.

At the opposite end of the bore in the valve spool or sleeve 33, that is to say adjacent the wax capsule 23, there is provided a vent valve comprising a valve plug 50 having an annular groove receiving a resilient rubber O-ring seal 51 and co-operating with a tapered portion 52 of the interior surface of this bore, such that as the plug 50 moves into the bore in a direction away from the wax capsule the adjacent end of the bore is sealed, while when the plug moves in the opposite direction, i.e. to the right as shown in FIGURE 1, the O-ring withdraws from the tapered portion and this end of the bore is unclosed. The radial dimensions of the plug 50 and the resilience of the O-ring seal 51 are such that the plug and the seal can move further to the left within the central bore in the valve spool 33, so that the end of the plug will engage the adjacent end of the stem 41. A radial passage (not shown) through the valve sleeve 33 at the right hand end of the valve provides communication between the extreme end of the central bore and the vent passage 32 in the housing, so that when the vent valve plug 50 is withdrawn towards the wax capsule the bore within the valve sleeve 33 is connected to atomsphere.

A compression spring 53 is provided within the bore of the valve sleeve, surrounding the hollow stem of the poppet valve member, and acting between an internal shoulder provided by the constriction in the valve sleeve and an abutment on the vent valve plug. Movement of the vent valve plug towards the wax capsule is limited by an abutment in the form of a spring clip 54 positioned within the bore in the valve sleeve at the end adjacent the wax capsule.

The plunger 26 of the wax capsule fits into a central recess in the vent valve plug 50 and the rim 22 on the casing of the caspule bears against a collar 55 which provides a limiting end abutment for the valve sleeve 33, so that any end thrust on the valve sleeve will not be applied directly to the control plunger 26 of the wax capsule.

In operation, assuming that the water temperature in the duct 16 is relatively low, the pressure of the compressed air at the inlet 30 will move the valve sleeve 33 towards the wax capsule end of the valve and will urge the poppet valve member in the same direction so as to close the main valve port formed by the head 40 on the poppet valve engaging the O-ring seal 42. In this condition all communication between the inlet and outlet passages 30, 31 is interrupted and since the wax capsule plunger 26 is fully withdrawn the vent valve plug 50 will also be withdrawn to the right by the spring 53 and the outlet passage 31 will be connected to the relief port 32.

When the water temperature reaches a selected value the substance within the capsule 23 expands and the control plunger 26 commences to move into the housing. In the first part of its movement it forces the vent valve plug 50 into the tapered part 52 of the bore in the valve sleeve, thus closing off the vent passage 32. The spring 53 is lightly compressed by this movement but the spring force is not sufficient to overcome the force of the air pressure exerted on the opposite ends of the first and second valve members 33, 34. Continued movement of the capsule plunger next causes the end of the vent valve plug 50 to engage the stem 41 of the poppet valve member. This causes the head 40 of the poppet valve to lift off the constriction forming the main valve seating, and compressed air is then admitted to the bore of the valve sleeve and flows through the radial passages 38 to the outlet passage 31, so as to engage the clutch 12.

If the temperature of the water continues to rise the control plunger 26, acting through the vent valve plug 50, will force the poppet valve further away from the wax capsule until it engages the abutment formed by the circlip 43 on the valve sleeve. Continued movement of the poppet valve will then cause the valve sleeve 33 to slide bodily within the valve housing. This will not affect the control function of the valve since the vent valve port 32 will remain closed and the outlet passage 31 will remain connected to the compressed air inlet 30. It will be seen that during ths extended movement no further compression of the spring 53 will occur since both the first and second valve members move conjointly within the valve housing.

This valve also provides a safety feature protecting the compressed air system against excessive leakage of air from the outlet passage or any part of the clutch operating system. It will be seen that if the valve is opened, regardless of the position of the wax capsule control plunger 26, any substantial reduction in pressure at the inlet 30 to the valve will allow the valve sleeve 33 to move away from the wax capsule element under the light spring force. The poppet valve member 34, which is not subject to this spring force, will tend to remain stationary but will thus move relative to the valve sleeve in a direction to close the main valve. As stated this protective feature will function at any water temperature.

It will also be noted that the valve is subject to extremely small frictional resistance to movement. As the temperature of the capsule 23 rises and the plunger 26 extends, the O-ring seal 52 presents slight frictional resistance, but the poppet valve head 40, and the seal 42, lift off the co-operating valve surface with minimal resistance. In effect there is only one seal, 52, which provides any resistance to normal control movements of the valve.

It will also be appreciated that in some applications the capsule 23 may be replaced by other control means, for example an automatic or manual mechanical linkage, or a remote control device.

I claim:
1. A fluid control valve comprising a valve housing formed with a longitudinal bore and inlet and outlet ports longitudinally spaced apart along said bore, a hollow spool slidable in said bore, and having an external seal engaging the walls of said bore between said inlet and outlet ports, and an internal passage for providing communication with the interior of the bore on opposite sides of said seal, a longitudinally movable valve element co-operating with said spool to open and close a main valve in said internal passage, said valve element being movable independently of said spool, an actuating member at a first end of said housing and engageable with said valve element to cause movement thereof towards the other end of said housing, lost motion abutment means acting between said movable valve element and said spool permitting limited movement of said movable valve element relative to said spool in a direction towards said other end of the housing to open said main valve, and constraining said spool to move together with said movable valve element when said actuating member moves further towards said other end of the housing, resilient biassing means acting on said spool in a direction towards said other end of the housing, and abutment means limiting movement of said spool towards said first end of the housing, the spool being subject to the fluid inlet pressure in the bore at said other end of the housing in opposition to said resilient biassing means whereby on a reduction in the fluid inlet pressure said resilient biassing means moves said spool towards said other end of the housing thereby to close the main valve.

2. A fluid control valve according to claim 1, wherein the end of said movable valve element adjacent said other end of the housing is exposed to the fluid inlet pressure in said bore.

3. A fluid control valve according to claim 1, wherein said housing is formed with an additional vent port longitudinally spaced from said inlet and outlet ports, and including a second longitudinally movable vent valve member cooperating with said spool to open or close a vent valve in a flow passage through said spool communicating between said vent port and said outlet port.

4. A fluid control valve according to claim 3, wherein said spool has a second external seal engaging the walls of said bore between said outlet port and said vent port, and said vent valve member is located between said actuating member and said movable valve element for transmitting movement of said actuating member to said valve element.

5. A fluid control valve according to claim 1, wherein said actuating member is connected to a thermostatic control element.

6. A fluid control valve according to claim 5, wherein said control element is an expandable wax capsule thermal senser.

7. A fluid control valve comprising a housing, providing a valve bore with longitudinally spaced inlet, outlet, and vent ports, a valve spool slidable in said bore and having two spaced external seals engaging said bore between said ports, and an internal passage through said spool having openings for communicating respectively with each of said ports, two separate individually movable valve members within said spool, and cooperating with said spool to open or close the internal passage respectively between said inlet and outlet ports, and between said outlet and vent ports, spring means acting between one of said valve members and said valve spool in a direction to close the internal passage between said inlet and outlet ports, abutment means acting between the other valve member and said valve spool limiting relative movement of said other member relative to said valve spool in a direction to open said internal passage between said inlet and outlet ports, and an actuating member at one end of said housing engageable with the first mentioned valve member, whereby initial movement of said actuating member closes said internal passage between said outlet and vent ports, further movement of said actuating member causes said first valve member to engage said second valve member and to open said internal passage, between said inlet and outlet ports, and any additional movement of said actuating member in the same direction causes bodily movement of said valve spool together with said two movable valve members.

References Cited

UNITED STATES PATENTS

| | | | |
|---|---|---|---|
| 2,820,473 | 1/1958 | Reiners | 236—92 X |
| 3,182,681 | 5/1965 | Gallo | 137—468 |
| 3,349,801 | 10/1967 | Grundmann | 137—627.5 |

ROBERT A. O'LEARY, *Primary Examiner.*

WILLIAM E. WAYNER, *Assistant Examiner.*

U.S. Cl. X.R.

137—468, 627.5